(12) United States Patent
Wada et al.

(10) Patent No.: US 12,033,654 B2
(45) Date of Patent: Jul. 9, 2024

(54) SOUND PICKUP DEVICE AND SOUND PICKUP METHOD

(71) Applicant: Panasonic Intellectual Property Management Co., Ltd., Osaka (JP)

(72) Inventors: Madoka Wada, Osaka (JP); Yoshifumi Hirose, Kyoto (JP); Yusuke Adachi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/705,687

(22) Filed: Mar. 28, 2022

(65) Prior Publication Data

US 2022/0215852 A1    Jul. 7, 2022

Related U.S. Application Data

(63) Continuation of application No. PCT/JP2020/033469, filed on Sep. 3, 2020.

(30) Foreign Application Priority Data

Oct. 30, 2019  (JP) .................................. 2019-197723

(51) Int. Cl.
*G10L 21/028*  (2013.01)
*G10L 15/22*  (2006.01)
(Continued)

(52) U.S. Cl.
CPC ............ *G10L 21/028* (2013.01); *G10L 15/22* (2013.01); *G10L 15/25* (2013.01); *G10L 21/0216* (2013.01); *G10L 2021/02166* (2013.01)

(58) Field of Classification Search
CPC ....... G10L 21/028; G10L 15/22; G10L 15/25; G10L 21/0216; G10L 21/02166
See application file for complete search history.

(56) References Cited

U.S. PATENT DOCUMENTS

2009/0210227 A1* 8/2009 Sugiyama ............... G10L 15/22
                                                               901/46
2012/0140022 A1* 6/2012 Kato ........................ H04N 7/15
                                                              348/E7.083
(Continued)

FOREIGN PATENT DOCUMENTS

JP      2013-008031       1/2013
JP      5215826           6/2013
(Continued)

OTHER PUBLICATIONS

International Search Report issued Nov. 10, 2020 in International Application No. PCT/JP2020/033469 with English translation.
(Continued)

*Primary Examiner* — Sonia L Gay
(74) *Attorney, Agent, or Firm* — Wenderoth, Lind & Ponack, L.L.P.

(57) ABSTRACT

A sound pickup device for picking up a target sound includes: a first input interface that inputs image data generated by a camera; a second input interface that inputs an audio signal output from a microphone array; a controller that determines a sound pickup direction in which the target sound is picked up, based on the image data and the audio signal; and an output interface that outputs information to be presented to the user. The controller determines whether an image indicated by the input image data and an audio sound indicated by the input audio signal are in a predetermined state. When determining that the image and the audio sound are in the predetermined state, the controller causes the output interface to output an instruction to the user, and
(Continued)

inputs additional image data and an additional audio signal after the instruction is output, to determine the sound pickup direction.

8 Claims, 12 Drawing Sheets

(51) Int. Cl.
*G10L 15/25* (2013.01)
*G10L 21/0216* (2013.01)

(56) References Cited

U.S. PATENT DOCUMENTS

2012/0330659 A1 12/2012 Nakadai
2016/0314785 A1 10/2016 Matsuoka et al.
2018/0374494 A1* 12/2018 Yamaya ................ G06V 40/20
2020/0105291 A1* 4/2020 Sheaffer ................ H04R 3/005
2021/0349309 A1* 11/2021 Kawano ................ G06F 3/011

FOREIGN PATENT DOCUMENTS

JP 2016-206646 12/2016
JP 2017-034645 2/2017
JP 2019-008134 1/2019

OTHER PUBLICATIONS

"Rapid Object Detection using a Boosted Cascade of Simple Features" Accepted Conference on Computer Vision and Pattern Recognition 2001, pp. 1-9.
English translation of the International Preliminary Report on Patentability issued May 12, 2022 in International Application No. PCT/JP2020/033469.

* cited by examiner

SOUND PICKUP DEVICE AND SOUND PICKUP METHOD

BACKGROUND

1. Technical Field

The present disclosure relates to a sound pickup device and a sound pickup method for picking up a target sound.

2. Related Art

JP 5215826 B2 discloses an estimation device for estimating when and which participant has spoken from data recording discourse by one or more participants. This estimation device calculates a probability that a discourse participant has spoken by integrating information obtained from an audio signal output from a microphone and information obtained from a video signal output from a camera. As a result, even in a case where the discourse participant moves in a situation without utterance, the position of the discourse participant can be tracked.

SUMMARY

The present disclosure provides a sound pickup device and a sound pickup method capable of facilitating to pick up a target sound.

A sound pickup device of one aspect of the present disclosure is a sound pickup device for picking up a target sound output from a sound source by a user, and includes a first input interface, a second input interface, a controller, and an output interface. The first input interface inputs image data generated by a camera. The second input interface inputs an audio signal output from a microphone array. The controller determines a sound pickup direction in which the target sound is picked up, based on the image data and the audio signal. The output interface outputs information to be presented to the user. The controller determines whether or not the image indicated by the input image data and the audio sound indicated by the input audio signal are in a predetermined state. When it is determined that the image and the audio sound are in the predetermined state, the controller causes the output interface to output an instruction to the user, and inputs additional image data and an additional audio signal after the instruction is output, to determine the sound pickup direction.

These general and specific aspects may be implemented by a system, a method, and a computer program, and a combination thereof.

According to the sound pickup device and the sound pickup method of the present disclosure, it is possible to facilitate to pick up a target sound by using an instruction to a user.

DESCRIPTION OF EMBODIMENTS

Embodiments will be described in detail below with reference to the drawings as appropriate. However, more detailed description than necessary may be omitted. For example, detailed description of already well-known matters and redundant description of substantially the same configuration may be omitted. This is to avoid the following description from becoming unnecessary redundant and to facilitate understanding by those skilled in the art.

In addition, the applicant(s) provides the accompanying drawings and the following description to enable those skilled in the art to sufficiently understand the present disclosure, which does not intend to limit the claimed subject matter.

First Embodiment

Hereinafter, a first embodiment of the present disclosure will be described with reference to the drawings. In the present embodiment, an example to pick up a human voice as an example of a target sound will be described.

1. Configuration 1-1. Overview

Figure 1:
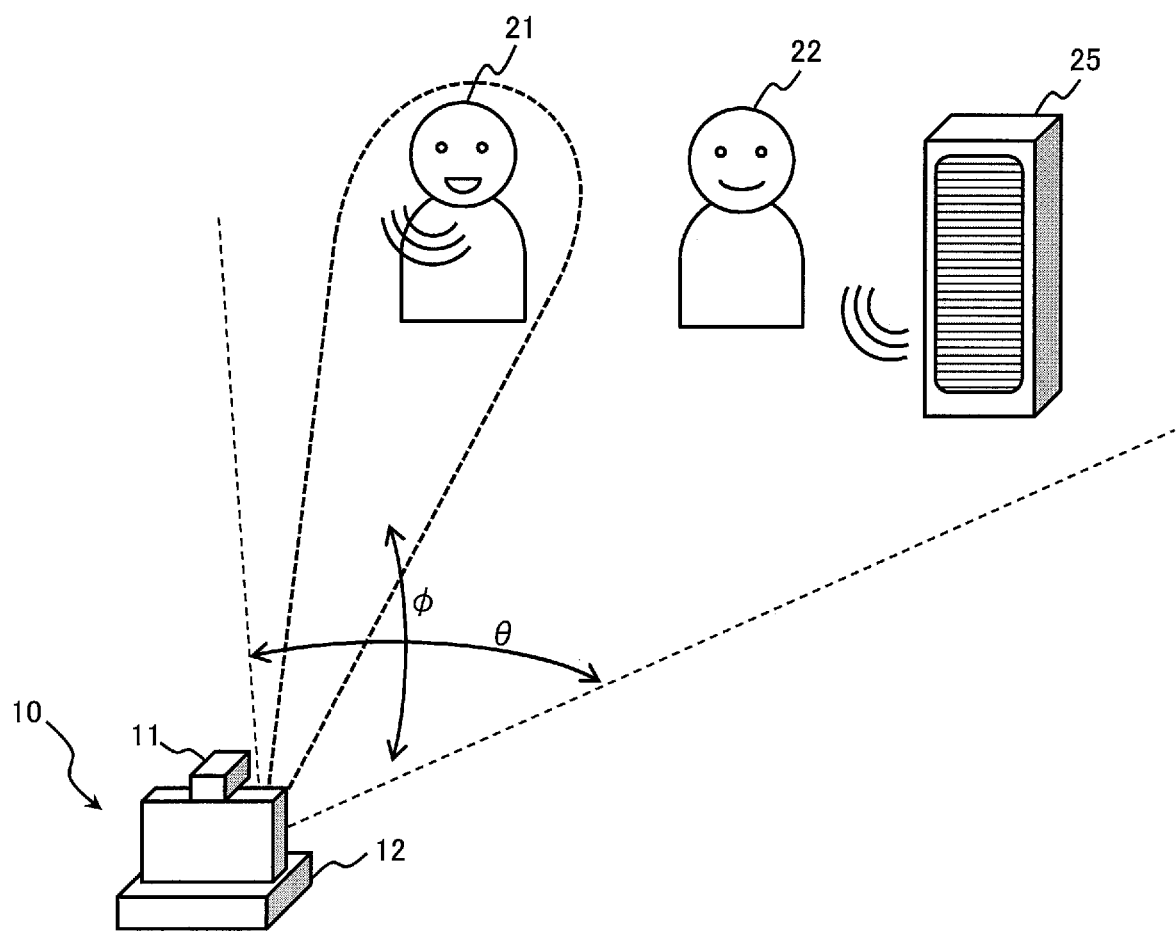
FIG. 1 is a diagram for explaining an outline of a sound pickup device according to a first embodiment of the present disclosure.

FIG. 1 is a diagram for explaining an outline of a sound pickup device 10 according to the present embodiment. The sound pickup device 10 of the present embodiment performs multi-modal voice emphasis using a camera 11 and a microphone array 12. The camera 11 captures an image of a detection range in an environment as a sound pickup target. The microphone array 12 receives a sound wave from the same detection range as that of the camera 11. In the drawing, a horizontal angle θ corresponding to a horizontal direction of the detection range and a vertical angle φ corresponding to a vertical direction are illustrated.

FIG. 1 illustrates an example in which plurality of persons 21 and 22 and a noise source 25 are within the detection range of the sound pickup device 10. For example, the sound pickup device 10 estimates a direction from the sound pickup device 10 toward a sound source of a target sound such as the person 21 who is speaking, based on the detection results by the camera 11 and the microphone array 12. Consequently, it is possible to perform voice emphasis so as to pick up only voice from a direction of the person 21 who is speaking with high sensitivity with avoiding the person 22 who is not speaking, the noise source 25, and the like.

The sound pickup device 10 of the present embodiment outputs an instruction to a user such as the person 21 in a timely manner so that the sound pickup device 10 can pick up the target sound even in a situation where the voice emphasis does not work effectively. Hereinafter, a configuration of the sound pickup device 10 of the present embodiment will be described.

1-2. Configuration of Sound Pickup Device

Figure 2:
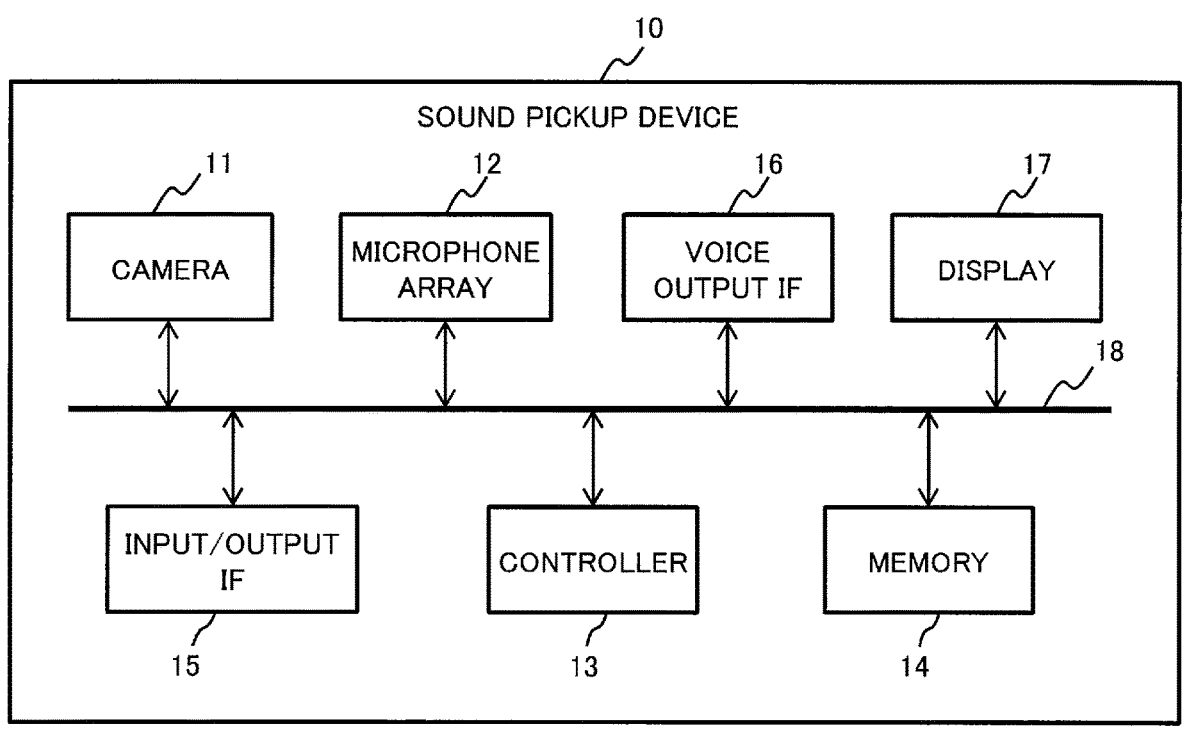
FIG. 2 is a block diagram illustrating a configuration of the sound pickup device.

FIG. 2 illustrates the configuration of the sound pickup device 10 according to the present embodiment. The sound pickup device 10 includes the camera 11, the microphone array 12, a controller 13, a memory 14, an input/output interface 15, a voice output interface 16, a display 17, and a bus 18. In the present embodiment, the sound pickup device 10 is a dedicated sound pickup device in which the camera 11 and the microphone array 12 are incorporated and integrated.

In another configuration example, the sound pickup device 1 may not include either one or both of the camera 11 and the microphone array 12. In this case, the sound pickup device 1 is electrically connected to the external camera 11 or the external microphone array 12. For example, the sound pickup device 1 may be an electronic device such as a smartphone, a tablet terminal, or a PC including the camera 11, and may be electrically and mechanically connected to an external device including the microphone array 12.

The camera 11 includes an image sensor such as a CCD image sensor, a CMOS image sensor, or an NMOS image sensor. The camera 11 generates and outputs image data which is a video signal.

The microphone array 12 includes a plurality of microphones. The microphone array 12 receives a sound wave in each microphone, converts the sound wave into an audio signal which is an electric signal, and outputs the audio signal. As the microphone array 12, a known beamforming technology for controlling directivity such as a sound pickup direction and a sound pickup range by adjusting a delay amount or the like between a plurality of microphones can be applied.

The controller 13 determines a sound pickup direction, based on the image data obtained from the camera 11 and the audio signal obtained from the microphone array 12. The sound pickup direction is a direction in which the target sound is to be picked up from the microphone array 12 based on the estimation that a target sound source exists. The target sound source is a sound source that outputs a target sound, and is a mouth of a person, for example. The controller 13 extracts the target sound from the audio signal output from the microphone array 12 by performing signal processing to emphasize a sound coming from the sound pickup direction. The controller 13 can be implemented by semiconductor circuitry or the like. The controller 13 can be configured by, for example, a microcomputer, CPU, MPU, DSP, FPGA, or ASIC.

Figure 3:
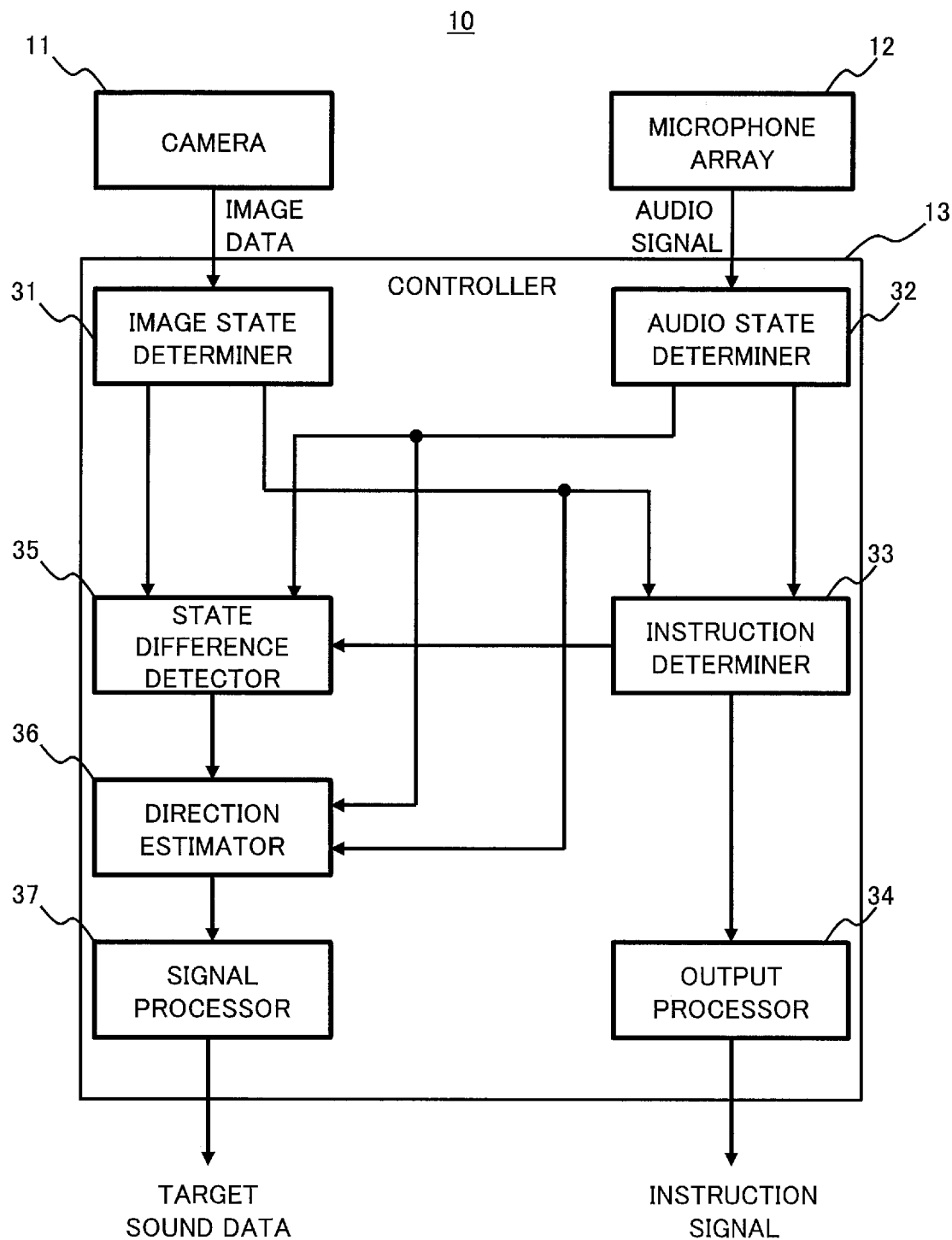
FIG. 3 is a block diagram illustrating functions of a controller in the sound pickup device of FIG. 2.

FIG. 3 illustrates a functional configuration of the controller 13 in the sound pickup device 10 of FIG. 2. The functions of the controller 13 may be configured only by hardware, or may be implemented by combining hardware and software. For example, as illustrated in FIG. 3, the controller 13 includes functional modules 31 to 37 such as an image state determiner 31, an audio state determiner 32, an instruction determiner 33, an output processor 34, a state difference detector 35, a direction estimator 36, and a signal processor 37. The operation of each of the functional modules 31 to 37 will be described later.

The memory 14 is a storage medium that stores programs and data necessary for implementing the functions of the sound pickup device 10. The memory 14 can be realized by a hard disk (HDD), SSD, RAM, DRAM, a ferroelectric memory, a flash memory, a magnetic disk, or a combination thereof, for example. The image data obtained from the camera 11 and the audio signal obtained from the microphone array 12 may be stored in the memory 14. For example, the memory 14 stores a state table and an instruction table to be described later. The memory 14 may store target sound data of a sound pickup result.

The input/output interface 15 includes a circuit that communicates with an external device according to a predetermined communication standard. For example, the predetermined communication standard includes LAN, Wi-Fi (registered trademark), Bluetooth (registered trademark), USB, and HDMI (registered trademark). The input/output interface 15 is an example of an input interface of the sound pickup device 10 for an external device, and is also an example of an output interface.

The voice output interface 16 is a speaker device that converts an audio signal into a sound wave. The voice output interface 16 is an example of an output interface that performs voice output and presents various information.

The display 17 is composed of, for example, a liquid crystal display or an organic EL display. The display 17 is an example of an output interface that displays various information. The display 17 may be various projectors or the like.

The bus 18 is a signal line that electrically connects the camera 11, the microphone array 12, the controller 13, the memory 14, the input/output interface 15, the voice output interface 16, and the display 17.

When the controller 13 acquires image data from the camera 11 or extracts it from the memory 14, the controller 13 corresponds to an input interface for the image data. When the controller 13 acquires an audio signal from the microphone array 12 or extracts it from the memory 14, the controller 13 corresponds to an input interface for the audio signal.

In the sound pickup device 10 of each of the above configuration examples, when the controller 13 extracts the image data from the memory 14, the controller 13 or the bus 18 corresponds to an input interface for the image data. When the controller 13 extracts the audio signal from the memory 14, the controller 13 or the bus 18 corresponds to an input interface for the audio signal. When the input/output interface 15 inputs image data from the camera 11 externally attached to the sound pickup device 10, the input/output interface 15 corresponds to an input interface for the image data. When the input/output interface 15 inputs an audio signal from the microphone array 12 externally attached to the sound pickup device 10, the input/output interface 15 corresponds to an input interface for the audio signal.

In the above configuration example, an example is described in which the sound pickup device 10 includes a plurality of output interfaces such as the voice output interface 16, the display 17, and the input/output interface 15, but the sound pickup device 10 may include any one of such output interfaces. Furthermore, the output interface is not limited to the above example, and may be e.g. a blinking lamp, a notification buzzer, or the like.

2. Operation

An operation of the sound pickup device 10 configured as described above will be described below.

Figure 4:
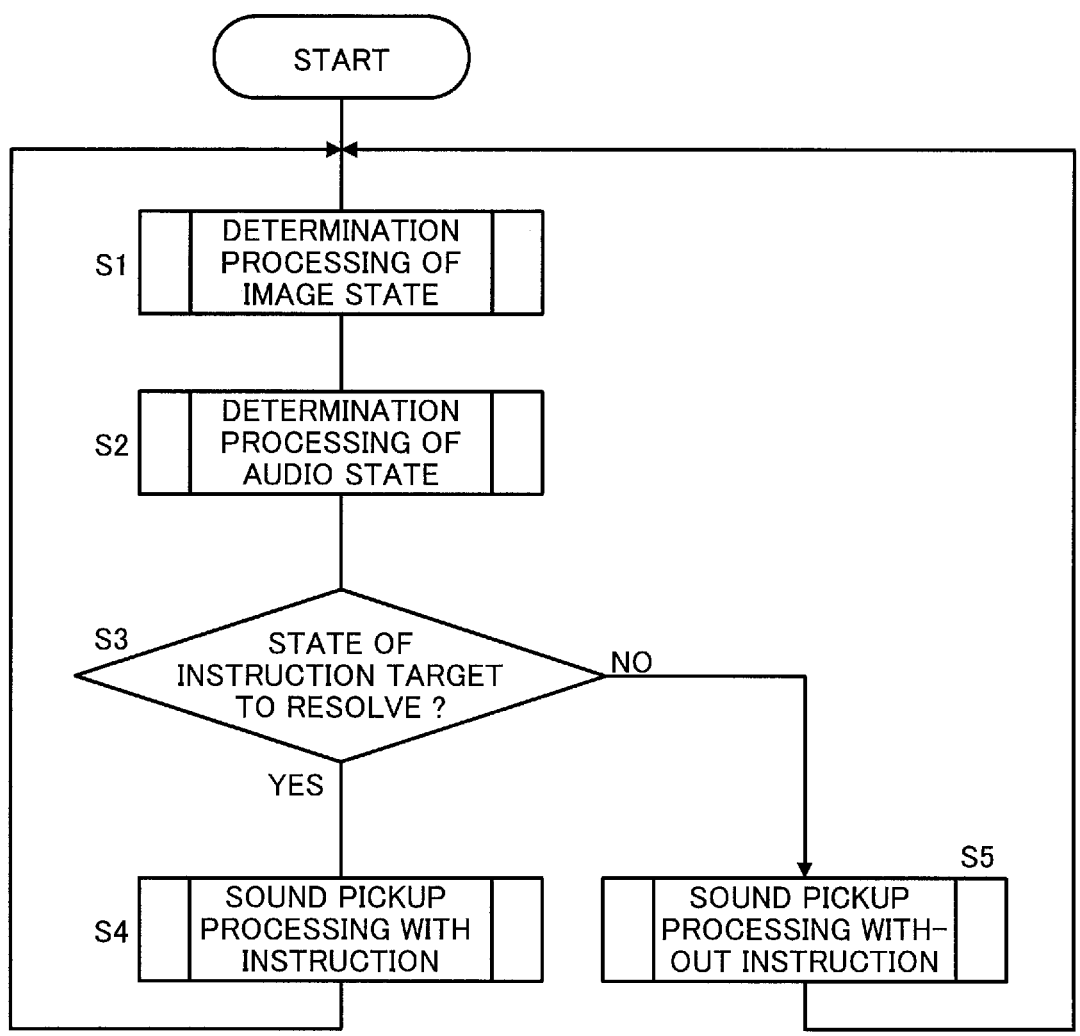
FIG. 4 is a flowchart illustrating a whole operation of the sound pickup device.

FIG. 4 is a flowchart illustrating a whole operation of the sound pickup device 10 according to the present embodiment. FIG. 5 is a diagram for explaining an outline of the operation of the sound pickup device 10. Each processing illustrated in the flowchart of FIG. 4 is executed by the controller 13 of the sound pickup device 10.

In the sound pickup device 10 of the present embodiment, the controller 13 executes determination processing of an image state by functioning as the image state determiner 31, based on the image data from the camera 11 (S1). Furthermore, the controller 13 executes determination processing of an audio state by functioning as the audio state determiner 32, based on the audio signal from the microphone array 12 (S2).

Steps S1 and S2 determine the current state of the user, the environment, and the like within the image indicated by the image data and the audio sound indicated by the audio signal. Details of the processing in steps S1 and S2 will be described later. The order of executing the processing in steps S1 and S2 is not particularly limited, and the processing may be executed in an order opposite to the illustrated order or may be executed in parallel.

Next, the controller 13 determines whether or not the determined current state of the image and the audio sound is a predetermined state which is a target of an instruction to the user (S3). An example of the state of the instruction target is illustrated in FIG. 5A.

Figure 5A:
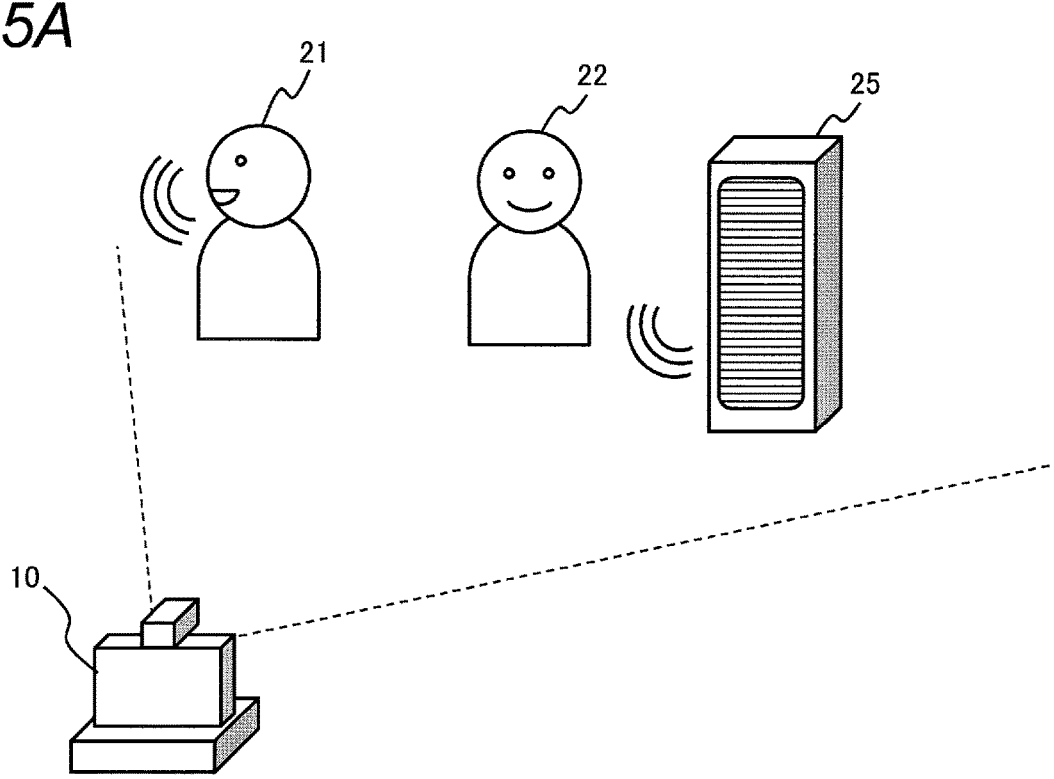
FIGS. 5A and 5B are diagrams for explaining an outline of the operation of the sound pickup device.

FIG. 5A illustrates a state in which the speaking person 21 (i.e., the user) faces a direction different from the camera 11 and the microphone array 12 of the sound pickup device 10. In such a state, it is difficult to derive an optimum direction for picking up the utterance, based on the image data and the audio signal. Even if processing to emphasize the voice from the optimum direction is performed on the audio signal, it is difficult to clearly pick up the target sound. Furthermore, it is conceivable that such a situation occurs not only due to the direction of the face of the person 21 but also due to various factors that hinder sound pickup, such as noise from the noise source 25.

Therefore, when the sound pickup device 10 of the present embodiment is in the above-described situation, the determination in step S3 is performed based on the current state of the image and the audio sound, in order to instruct the user to improve the state. The state of the instruction target in step S3 can be set to various states considered to be indicated to the user in view of difficulty to pick up the target sound. Details of step S3 will be described later.

When determining that the current state of the image and the audio sound is the state of the instruction target (YES in S3), the controller 13 executes sound pickup processing with an instruction to the user (S4). The outline of the processing in step S4 will be described with reference to FIG. 5B.

Figure 5B:
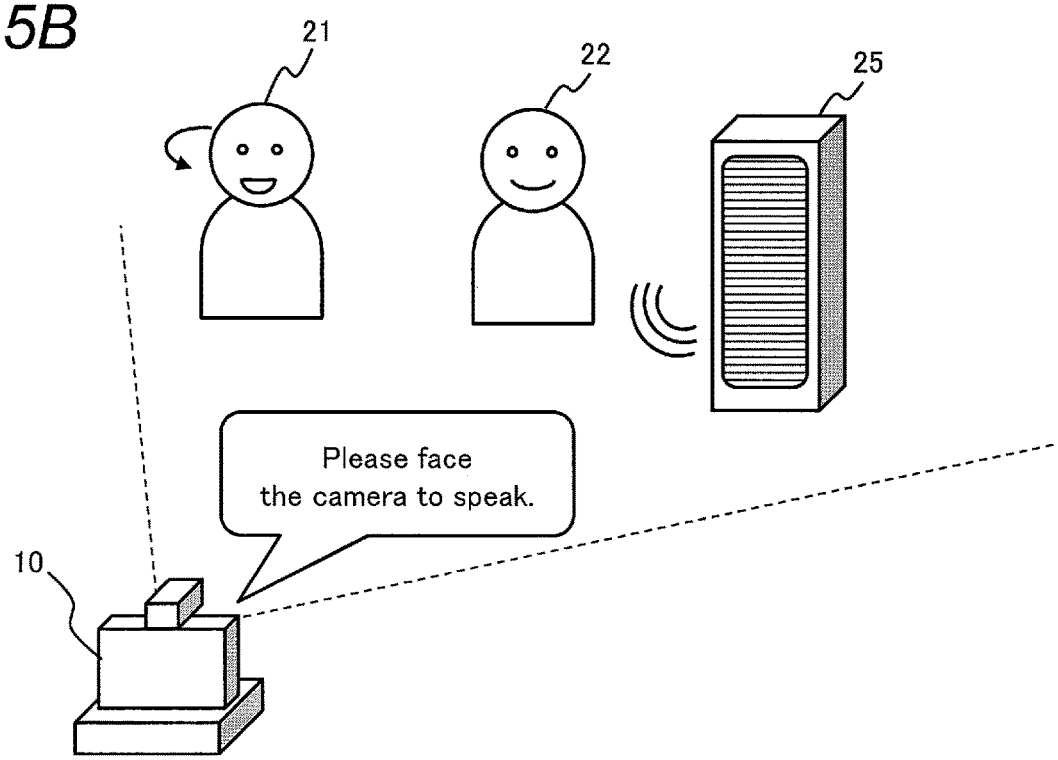

FIG. 5B illustrates a case where an instruction is output from the state of FIG. 5A. In the present example, the voice output interface 16 of the sound pickup device 10 outputs a voice of an instruction "Please face the camera to speak". According to the output of such an instruction, the user can understand that there is a problem for the sound pickup of the utterance and the reason thereof.

Furthermore, in the present example, it is expected that the person 21 whose utterance is desired to be picked up will improve the direction of the face and speak again according to the output instruction. Therefore, in the sound pickup processing (S4) with the instruction of the present embodiment, the accuracy for picking up the utterance again is improved based on the difference between the states before and after the instruction. Details of the processing in step S4 will be described later.

Returning to FIG. 4, when determining that the current state of the image and the audio sound is not the state of the instruction target (NO in S3), the controller executes the sound pickup processing without an instruction particularly (S5). According to the processing of step S5, the target sound can be picked up without an unnecessary instruction when the sound can be picked up without giving an instruction to the user, for example. Details of the processing in step S5 will be described later.

After performing the sound pickup processing in step S4 or step S5, the controller 13 repeats the processing of step S1 and subsequent steps periodically, for example.

According to the above operation, the sound pickup device 10 determines the image state and the audio state as needed (S1, S2). When a state to be resolved is detected (YES in S3), the sound pickup device 10 performs the sound pickup processing (S4) with an instruction to the user. Consequently, it is possible to realize voice emphasis with a fast time response, by using the instruction for the user to resolve the state having difficulty to pick up the target sound, and then performing sound pickup.

On the other hand, the sound pickup device 10 performs the sound pickup processing without an instruction (S5) when the state is not particularly a state to be resolved (NO in S3). As a result, it is possible to avoid a situation in which unnecessary instructions frequently occur and become troublesome for the user. Details of the operation of the sound pickup device 10 described above will be described below.

2-1. Determination Processing of Image State (S1)

Details of the processing of step S1 in FIG. 4 will be described with reference to FIGS. 6 and 7.

Figure 6:
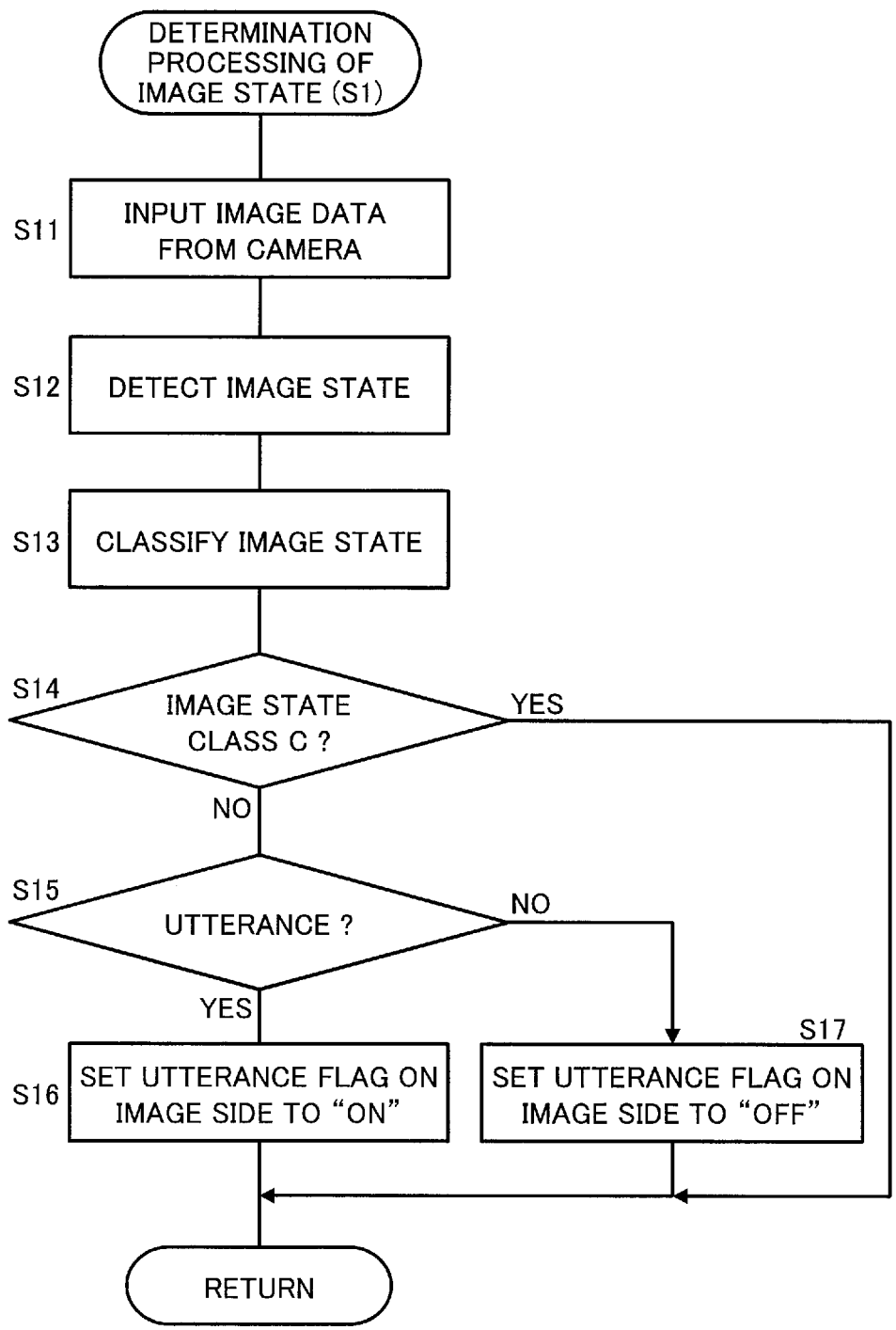
FIG. 6 is a flowchart illustrating determination processing of an image state in the sound pickup device.

FIG. 6 is a flowchart illustrating determination processing of the image state in the sound pickup device 10 (S1). The controller 13, serving as the image state determiner 31, executes each processing of the flowchart illustrated in FIG. 6.

At first, the controller 13 as the image state determiner 31 inputs image data from the camera 11 via the bus 18 (S11). The camera 11 generates image data indicating a captured image at a predetermined frame rate, for example. For example, the image data is sequentially input for each frame.

Next, the controller 13 detects various states of the image related to the utterance, based on the input image data (S12). For example, the controller 13 first detects a person in the image indicated by the image data, and then detects a face in a region of the person in the image in the case where the person is detected. Furthermore, when the face is detected, the controller 13 detects a direction of the face and parts such as a mouth in the image. Based on detection results for a plurality of frames, the controller 13 detects movement of an object such as the mouth, for example. Each of the various detection targets is an example of information indicating the arrangement of the target sound source in the image.

Various detection in step S12 as described above can be performed using a discriminator that identifies a feature value of each target, for example. For example, weak discriminators on which machine learning are performed in advance can be used (see, e.g., "Rapid Object Detection using a Boosted Cascade of Simple Features" ACCEPTED CONFERENCE ON COMPUTER VISION AND PATTERN RECOGNITION 2001). The region of the detected object can be represented by horizontal coordinates and vertical coordinates in the image indicated by the image data, for example.

Figure 7:
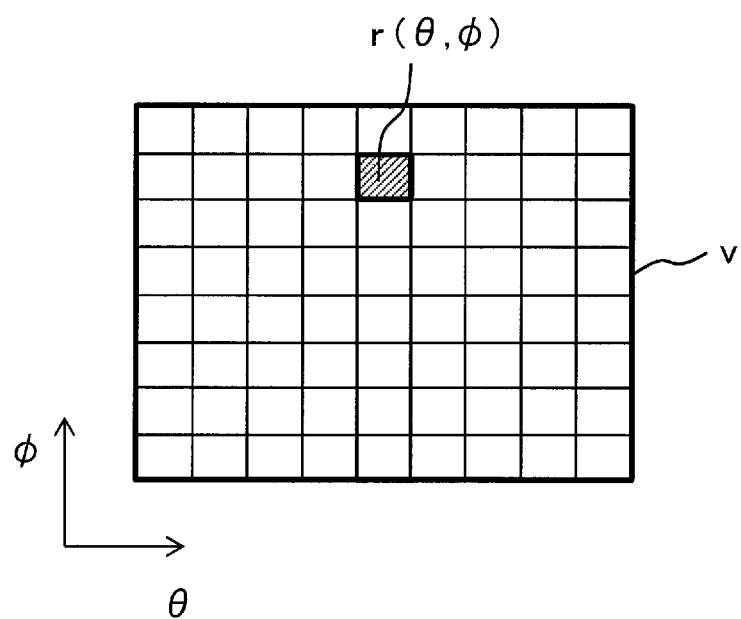
FIG. 7 is a diagram for explaining a region of a unit of detection in image data.

FIG. 7 illustrates a region r (θ, φ) of the unit of detection in image data v. In step S12, the image indicated by the image data v is divided into a plurality of regions r (θ, φ) at coordinates corresponding to the horizontal angle θ and the vertical angle φ, to record the detection result for each region r (θ, φ), for example. In FIG. 7, the two axes for division into a lattice shape are associated with θ and φ, but in a case where an entire circumference camera is used, θ and φ may be associated with axes for a circumference shape.

Returning to FIG. 6, the controller 13 classifies the current image state in a preset classification class, based on the various information detected from the image, for example (S13). For example, the classification classes in step S13 are Class A, Class B, and Class C that are set in three stages in order from the best image state in terms of a detection result of the mouth of the face on the image (see FIG. 9). The image states may not be classified into three stages.

Class A for the image state includes an image state in which the face and the mouth are detected and the detected face direction is a forward direction, that is, a direction facing the camera 11. According to the image state of Class A, it is considered that the presence or absence of the utterance can be determined on the basis of the movement of the mouth in the image, and the direction in which the utterance is picked up can be determined only by the image when the utterance is present.

Class B for the image includes an image state in which the face and the mouth are detected but the detected face direction is a direction different from the forward direction (e.g., a sideways direction). According to the image state of Class B, it is conceivable that, even if the determination of the presence or absence of the utterance can be executed based on the movement of the mouth, it is difficult to determine the sound pickup direction of the utterance only with the image, or it is difficult to determine whether the utterance can be picked up.

Class C for the image is a state in which the face or the mouth is not detected. According to the image state of Class C, the determination of the presence or absence of the utterance based on the movement of the mouth cannot be executed. For example, a case as the image state of Class C is considered where, even though a person is detected, the person is wearing a mask on the mouth, the face is facing backward, the distance between the person and the camera 11 is too long, or the image is too dark. Class C is not necessarily limited to a case where a person is detected, and may include a case where no person is detected.

For example, in a case where the classified image state is Class A or Class B, that is, in a case where the classified image state is not Class C (NO in S14), the controller 13 determines the presence or absence of the utterance, based on the detection result of the image state (S15). Specifically, the controller 13 calculates an utterance score indicating the likelihood of whether the movement of the mouth in the image state is an utterance, and compares the utterance score of the image state with a predetermined threshold. The threshold indicates a criterion of an utterance score that is large enough to be sure that the movement of the mouth is an utterance.

When the utterance score of the image state is equal to or more than the threshold, as a result of the determination that the utterance is present (YES in S15), the controller 13 sets an utterance flag on the image side to "ON" (S16). The utterance flag on the image side is a flag that manages the determination result of the presence or absence of the utterance according to the image state, and is stored in the memory 14, for example.

When the utterance score of the image state is less than the threshold, as a result of the determination that no utterance is present (NO in S15), the controller 13 sets the utterance flag on the image side to "OFF" (S17). After setting the utterance flag on the image side (S16, S17), the controller 13 ends the processing of step S1 in FIG. 4, and proceeds to step S2, for example.

On the other hand, in a case where the classified image state is Class C (YES in S14), the controller 13 does not determine the utterance based on the image state (S15 to S17), and ends the processing in step S1.

According to the above determination processing of the image state (S1), based on the image data sequentially input from the camera 11 (S11), the various information indicating the arrangement of the sound source such as the mouth of the person in the image are detected (S12), and the current image state is determined (S13 to S17).

2-2. Determination Processing of Audio State (S2)

Details of the processing of step S2 in FIG. 4 will be described with reference to FIG. 8.

Figure 8:
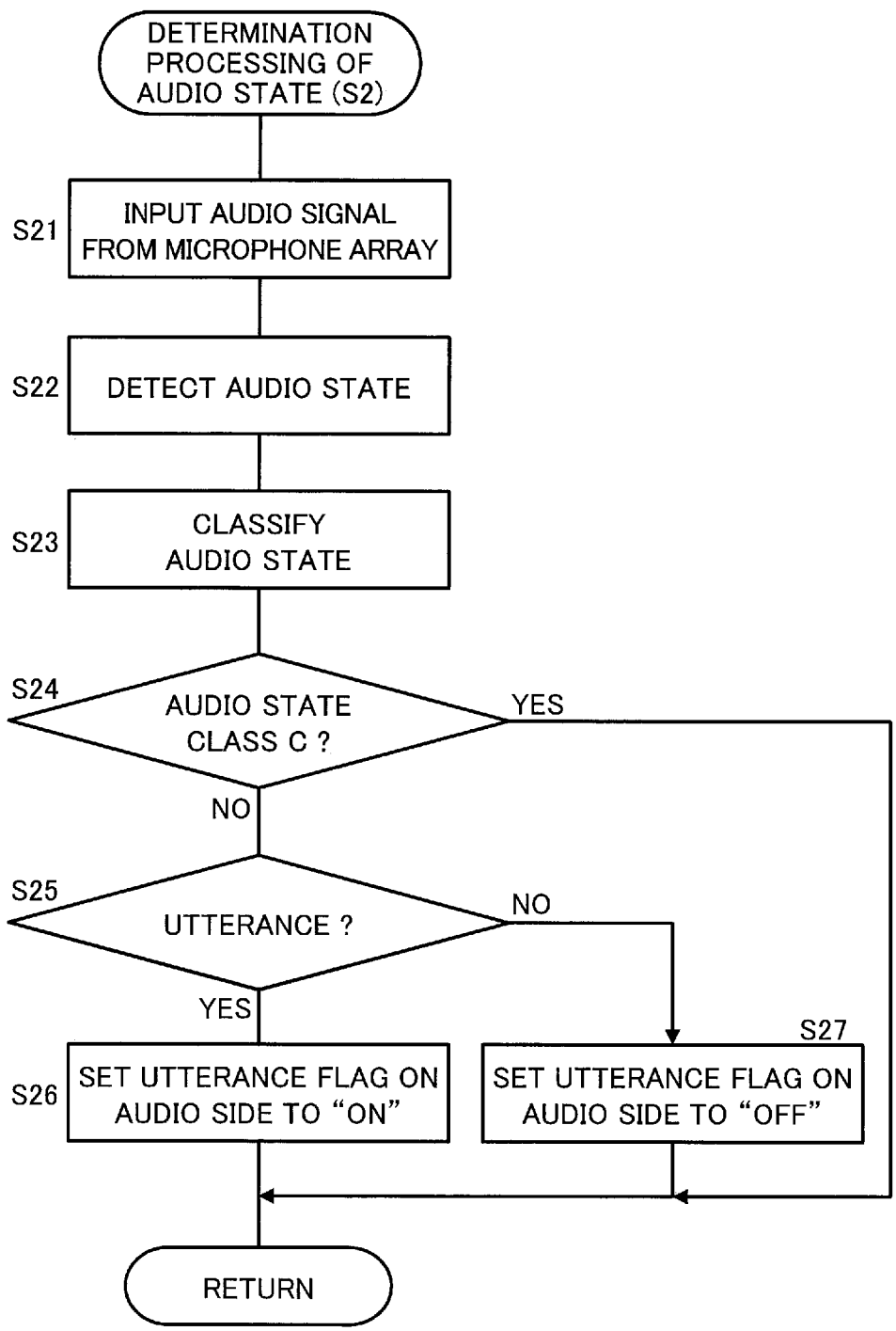
FIG. 8 is a flowchart illustrating determination processing of an audio state in the sound pickup device.

FIG. 8 is a flowchart illustrating the determination processing of the audio state (S2). The controller 13, serving as the audio state determiner 32, executes each processing of the flowchart illustrated in FIG. 8.

At first, the controller 13 as the audio state determiner 32 acquires an audio signal from the microphone array 12 via the bus 18 (S21). The microphone array 12 sequentially generates the audio signal according to a sound wave received from the outside. In step S21, the audio signal is acquired in synchronization with the image data acquired in step S11 in FIG. 6, for example.

Next, the controller 13 detects various states of the audio sound related to the utterance, based on the acquired audio signal (S22). The detection in step S22 is performed for each direction (θ, φ) corresponding to the region r (θ, φ) of each unit of detection in FIG. 7, for example.

For example, in step S22, the controller 13 performs calculation for estimating the position of the sound source or the direction in which the sound comes from the sound source by a cross-power spectrum phase analysis (CSP) method, a multiple signal classification (MUSIC) method, or the like. Furthermore, the controller 13 detects a sound in a frequency band of a human voice that is a target sound, or detects noise different from the target sound by using a voice Gaussian mixture model (GMM) and a non-voice GMM which are trained in advance, for example.

Based on the various detection results of the audio sound, the controller 13 classifies the current audio state in a predetermined classification class (S23), for example, similarly to the classification of the image state (S13). For example, the classification class in step S23 are Classes A, B, and C that are set in three stages in order from the best audio state in terms of a noise detection result (see FIG. 9).

Class A for the audio sound includes an audio state in which the detected signal level of noise is below a lower limit level where noise can interfere with detection of a target sound such as an utterance, for example. Class A may include an audio state in which noise can be separated from a target sound from the viewpoint of a frequency, a phase (or an arrival direction), and the like. According to the audio state of Class A, it is considered that the presence or absence of the utterance can be determined from the detection result of the target sound, and the sound pickup direction of the utterance can be determined without using the image state when the utterance is present.

Class B for the audio sound includes an audio state in which the detected signal level of noise is between the lower limit level and the upper limit level, for example. The upper limit level of the noise indicates an upper limit at which the noise can be separated from the target sound from the viewpoint of the signal level, and is set larger than the lower limit level. Class B may include an audio state in which it is difficult to separate noise from a target sound from viewpoint of a frequency, a phase, and the like, for example, due to a frequency band of noise being in the vicinity of a frequency band of human voice. According to the audio state of Class B, some difficulty is conceivable for determining the sound pickup direction of the utterance, or for determining whether or not the utterance can be picked up without the image state even when the presence or absence of the voice of the utterance can be determined.

Class C for the audio sound includes an audio state in which the detected signal level of noise is above the upper limit level, for example. Class C may include an audio state in which noise cannot be separated from a target sound from the viewpoint of a frequency, a phase, and the like. According to the audio state of Class C, the presence or absence of the voice of the utterance cannot be determined.

For example, in a case where the classified audio state is Class A or Class B and is not Class C (NO in S24), the controller 13 determines the presence or absence of the utterance, based on the detection result of the audio state (S25). Specifically, the controller 13 calculates an utterance score indicating the likelihood of whether the detected voice is a human voice, and compares the utterance score of the audio state with a predetermined threshold. The threshold indicates a criterion of an utterance score that is large enough to be sure that the voice is a human voice.

When the utterance score of the audio state is equal to or greater than the threshold, as a result of determination that the utterance is present (YES in S25), the controller 13 sets the utterance flag on the audio side to "ON" (S26). The utterance flag on the audio side is a flag that manages the determination result of the presence or absence of the utterance according to the audio state, and is stored in the memory 14 separately from the utterance flag on the image side, for example.

When the utterance score of the audio state is less than the threshold, as a result of the determination that no utterance is present (NO in S25), the controller 13 sets the utterance flag on the audio side to "OFF" (S27). After setting the utterance flag on the audio side (S26, S27), the controller 13 ends the processing of step S2 in FIG. 4, and proceeds to step S3, for example.

On the other hand, in a case where the classified audio state is Class C (YES in S24), the controller 13 ends the processing of step S2 without determining the utterance based on the audio state (S25 to S27).

According to the above determination processing of the audio state, the target sound and the noise are detected (S22) based on the audio signal sequentially input from the microphone array 12 (S21), and the current audio state is determined (S23 to S27).

2-3. State of Instruction Target (S3)

Details of the determination in step S3 of FIG. 4 and the state of the instruction target will be described with reference to FIG. 9.

Figure 9:
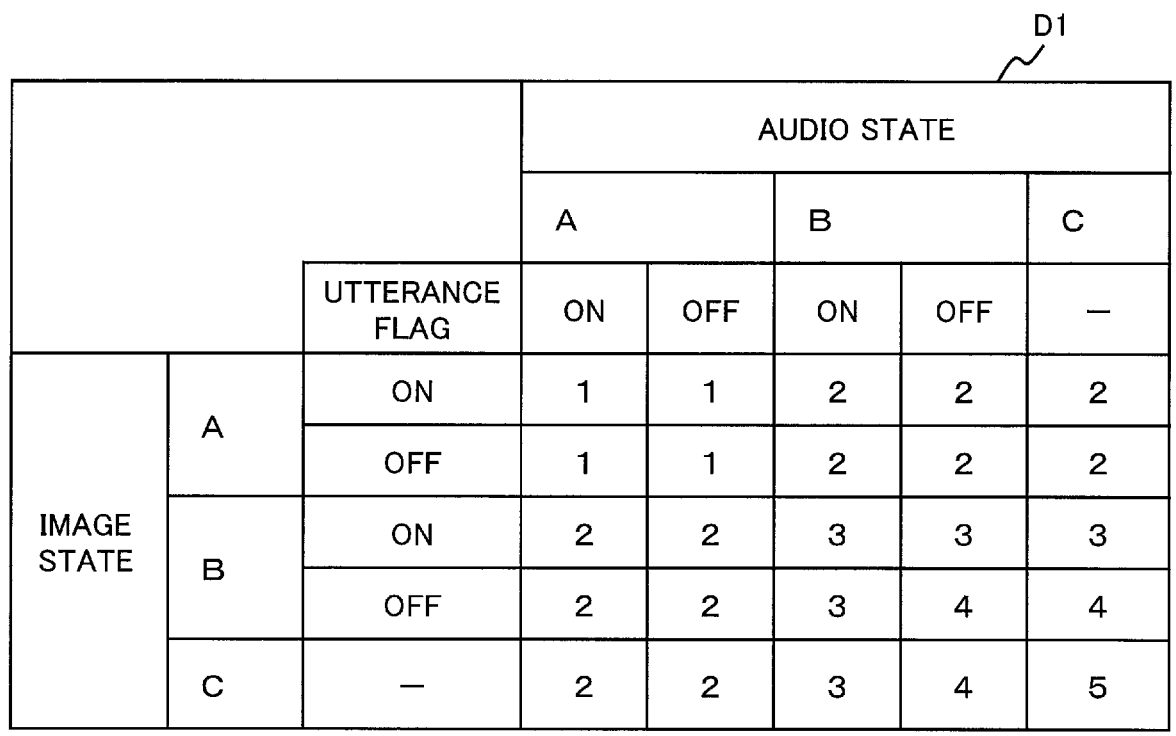
FIG. 9 is a diagram illustrating a state table in the sound pickup device.

FIG. 9 is a diagram illustrating a state table D1 in the sound pickup device 10. The state table D1 is a data table that manages a state of an instruction target and a state of a non-target in association with an image state and an audio state, and is stored in advance in the memory 14, for example. In the figure, "-" regarding each utterance flag indicates that the presence or absence of the utterance has not been determined.

In the present embodiment, the determination in step S3 is made by combining an image state and an audio state as illustrated in FIG. 9, for example. Referring to the state table D1 the controller 13 determines whether or not the current state corresponding to the determination result of the image state (S1) and the determination result of the audio state (S2) is the state of the instruction target (S3).

The state table D1 illustrated in FIG. 9 defines five-stage states 1 to 5 by a combination of Classes A, B, and C of the image state and ON/OFF of the utterance flag on the image side with Classes A, B, and C of the audio state and ON/OFF of the utterance flag on the audio side. In the present embodiment, the state to be the instruction target of the state improvement is State 3 (YES in S3), and the other States 1, 2, 4, and 5 are not the instruction target (NO in S3). The state may not be five stages.

State 1 is a state in which both the image state and the audio state are Class A. According to State 1, as the utterance can be determined in both the image state and the audio state, it is presumed that the utterance can be picked up without particularly using an instruction for improving the state.

State 2 is a state in which one of the image state and the audio state is Class A and the other is Class B or Class C. According to State 2, as the utterance can be determined in the one of the image state and the audio state, it is presumed that the utterance can be picked up without particularly using an instruction.

State 3 is a state in which both the image state and the audio state are Class B or Class C and at least one of the image state and the sound state is Class B with at least one of the utterance flags on the image side and the audio side being "ON". According to State 3, although it is determined that the utterance is present, to determine the sound pickup direction of the utterance is difficult in both the image state and the audio state. Therefore, it is presumed to be useful to output an instruction to resolve such a state having a fault with which the sound pickup direction cannot be determined.

State 4 is a state in which, in the similar classification class to State 3, not both the utterance flags on the image side and the audio side are "ON", but at least one of the utterance flags is "OFF". According to State 4, to determine the sound pickup direction and the like is difficult in both the image state and the audio state, but it is determined that no utterance is present. Thus, it is presumed that output of an instruction is unnecessary in particular.

State 5 is a state in which both the image state and the audio state are Class C. According to State 5, it is not possible to determine whether or not the utterance is present, the sound pickup direction, and the like. Thus, there may be a case where no utterance is made and no instruction is particularly required, as well as difficult to output an instruction to designate appropriate content for improving the state.

By setting the instruction target state as State 3 among States 1 to 5 as described above, it is possible to avoid a situation in which even though it is determined that the utterance is being made, the sound pickup direction cannot be determined, resulting in that the target sound is not picked up. Note that the above-described states of the instruction target and the non-target are examples. The state of the instruction target is not particularly limited to State 3 described above, and may be a state including various faults that make it difficult to determine the sound pickup direction, and can be appropriately set according to a scene or the like where the sound pickup device 10 is applied.

2-4. Sound Pickup Processing with Instruction (S4)

Details of the processing of step S4 in FIG. 4 will be described with reference to FIGS. 10 and 11.

Figure 10:
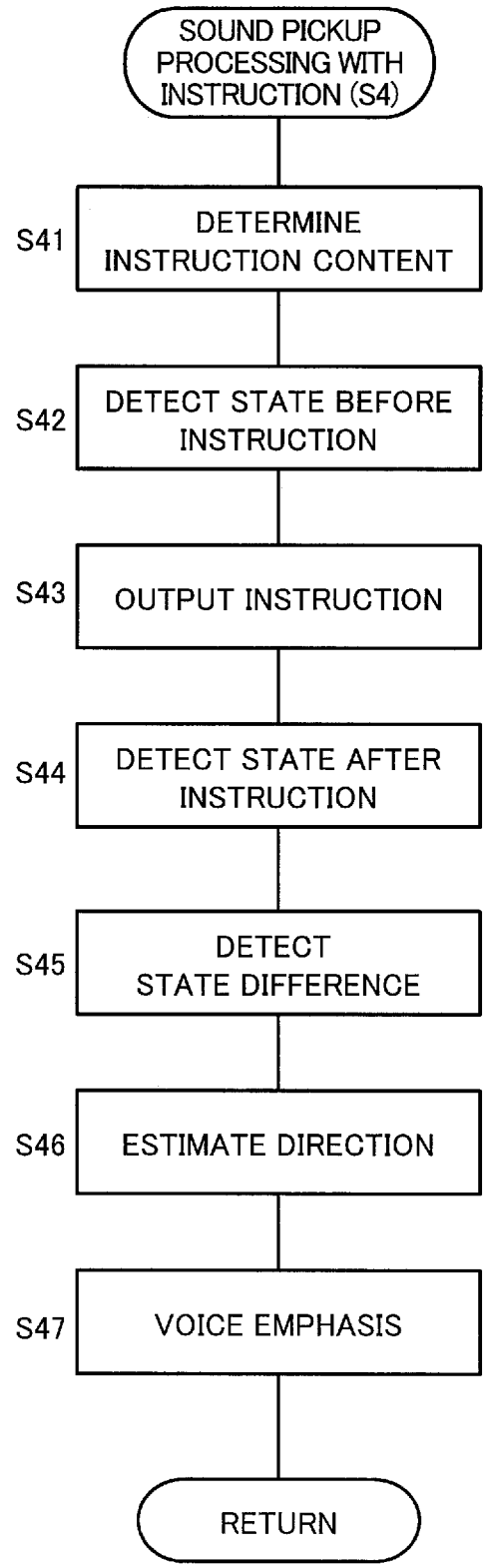
FIG. 10 is a flowchart illustrating sound pickup processing via an instruction in the sound pickup device.

FIG. 10 is a flowchart illustrating the sound pickup processing (S4) with an instruction. The processing illustrated in this flowchart is executed when the current state is State 3 in FIG. 9 (YES in S3).

At first, the controller 13, serving as the instruction determiner 33, determines the content of information to be included in the instruction, based on the current state obtained in steps S1 to S3 (S41). The processing in step S41 is performed with reference to an instruction table D2 as illustrated in FIG. 11, for example. The instruction table D2 is a data table that manages an instruction content indicating information to be included in the instruction, and is stored in the memory 14 in advance.

Figure 11:
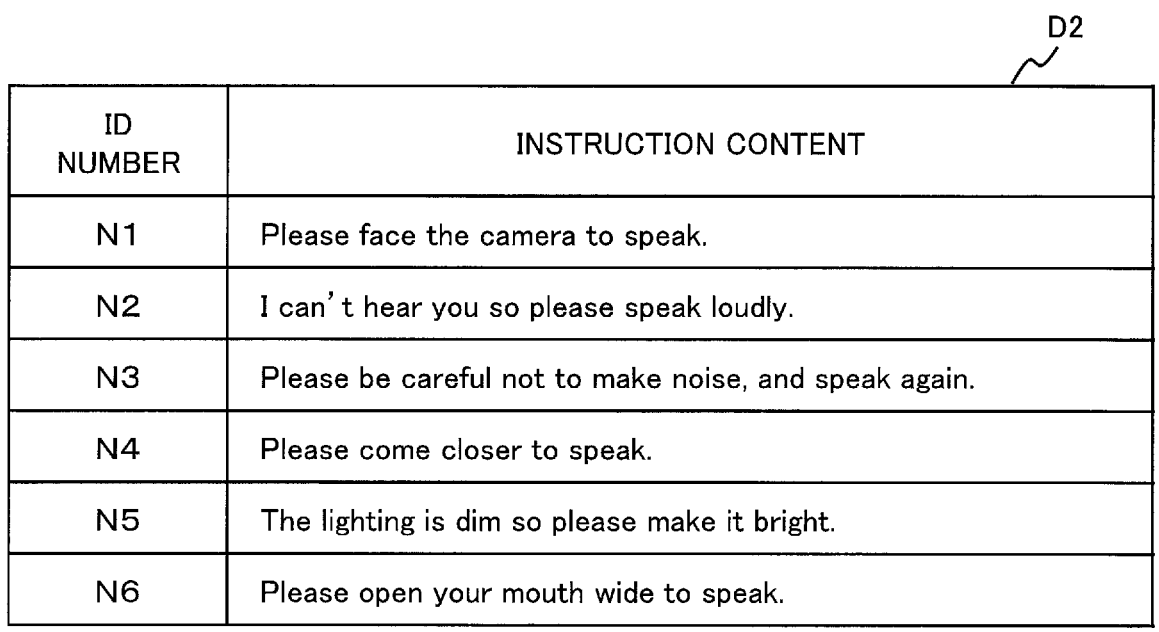
FIG. 11 is a diagram illustrating an instruction table in the sound pickup device.

The instruction table D2 illustrated in FIG. 11 records an ID number for identifying an instruction content, and the instruction content in association with each other. In step S41, the controller 13 as the instruction determiner 33 selects an ID number to be determined as the instruction content from the instruction table D2, based on the current state determined in step S3 of FIG. 4, for example. The instruction determiner 33 may use the detection results of various image states in step S1 (S12 in FIG. 6) and the detection results of various audio states in step S2 (S22 in FIG. 8), appropriately. In addition, the instruction content may be determined from a combination of each of the image states and the audio states classified into State 3 using the state table D1 (FIG. 9).

For example, in a case where both the image state and the audio state are Class B, it may be difficult to pick up the utterance as the face direction is not the forward direction on the image (see FIG. 5A). In such a case, the instruction determiner 33 selects an ID number N1. According to the instruction content of the ID number N1, it is possible to realize an instruction to resolve the state in which there is such a fault that the face direction is not the forward direction (see FIG. 5B).

In a case where the utterance flag on the image side is ON and the utterance flag on the audio side is OFF, it is presumed that the movement of the mouth is detected as an utterance, but the voice of the utterance is not sufficiently obtained. In this case, the instruction determiner 33 selects an ID number N2. In a case where the audio state is Class C with significant noise, the instruction determiner 33 selects an ID number N3. In a case where the image state is Class C with the person speaking being too far to detect the movement of the mouth, the instruction determiner 33 selects an ID number N4. By the selection from the instruction table D2 as the above, the instruction content can be set so as to resolve the state in which the utterance cannot be picked up due to each fault. The instruction determiner 33 can detect various faults, based on the detection results of the image state and the audio state.

Returning to FIG. 10, the controller 13 detects an image state and an audio state obtained before an instruction is output, for example (S42). In step S42, the controller 13, serving as the image state determiner 31 and the audio state determiner 32, performs processing similar to steps S11 and S12 in FIG. 6 and steps S21 and S22 in FIG. 8, for example. In step S42, for example, an image state to be detected is such as a position of a person, a direction of a face, a position of a mouth, and a distance between the person and the camera 11. As the audio state, the probability of the arrival direction of the voice due to the phase difference, the likelihood of the human voice for each direction, and the like are detected.

Furthermore, the controller 13, serving as the output processor 34, transmits an instruction signal for controlling various output interfaces to output the determined instruction via the bus 18 (S43). For example, the controller 13 as the output processor 34 controls the voice output interface 16 to output the instruction content by voice. The controller 13 may cause the display 17 to display the instruction content. Furthermore, in an exemplary case where the instruction is presented to the user using an external device such as an external monitor, the controller 13 transmits an instruction signal for the external device to the input/output interface 15 as an output interface.

Next, the controller 13 detects the image state and the audio state obtained after the instruction (S44). In step S44, the controller 13 as the image state determiner and the audio state determiner 32 performs the same detection as the detection before the instruction (S42), after a predetermined period from the output of the instruction, for example. The predetermined period is a period in which the user is presumed to start an action according to an instruction, and is e.g. one second. The processing of step S44 is similar to those in steps S11 and S12 in FIG. 6 and steps S21 and S22 in FIG. 8, for example.

Next, the controller 13, serving as the state difference detector 35, detects a difference between the image and audio states (S42) before the instruction and the image and audio states (S44) after the instruction (S45). At this step, it is expected that the difference between the states before and after the instruction is detected from the portion where the user utters responding to the instruction for state improvement in the detection range of the sound pickup device 10, but the difference between the states is not detected from the other portion that is irrelevant to the response to the instruction therein.

In step S45, the controller 13 as the state difference detector 35 detects, as the difference between the image states, the position of the person, the direction of the face, the mouth, and the like changed before and after the instruction, for example. For example, the controller 13 calculates a difference score indicating the degree of difference between the detected image states for each region r ($\theta$, $\varphi$) of the unit of detection in the image. For example, the controller 13 detects the probability of the arrival direction of the voice changed before and after the instruction and the likelihood of the human voice in each direction ($\theta$, $\varphi$) as the difference between the audio states. The controller 13 calculates a difference score indicating the degree of difference between the detected audio states for each direction.

Next, the controller 13, serving as the direction estimator 36, performs calculation to estimate the direction in which the target sound by the utterance after the instruction arrives, based on the difference between the detected states (S46). For example, the controller 13 calculates the linear sum for the difference score of the image states and the difference score of the audio states in each direction within the detection range, and determines a direction in which the calculated score is the highest as the sound pickup direction of the target sound. The linear sum of the difference scores may be a weighted sum that weights the image state and the audio state, respectively. In addition, multiplication or nonlinear calculation may be appropriately adopted instead of the linear sum.

Next, the controller 13, serving as the signal processor 37, executes processing to emphasize the sound from the sound pickup direction of the calculation result (S47). For example, the signal processor 37 performs signal processing so as to direct a beam in the sound pickup direction by beamforming, and generates target sound data indicating a sound pickup result of the target sound. The signal processor 37 may perform various signal processing to emphasize a target sound such as a frequency filter. The target sound data is stored in the memory 14, for example.

After executing the voice emphasis (S47), the controller 13 ends the processing of step S4 in FIG. 4. Thereafter, the controller 13 returns to step S1, and performs the subsequent processing again, for example.

According to the above sound pickup processing (S4) with the instruction, for example in the state of FIG. 5A, the instruction content of the ID number N1 is output as illustrated in FIG. 5B (S41 to S43). At this time, the person 21 who has spoken improves the direction of the face according to the instruction, so that the next utterance can be picked up. On the other hand, the person 22 who is not speaking, the noise source 25, and the like do not respond to the instruction. Therefore, the person 21 whose face direction has been improved as the difference between the states before and after the instruction can be easily detected (S44, S45), and the sound pickup direction can be accurately determined (S46, S47), for example.

As another example of the difference between the states in step S46 in addition to the above, it is conceivable that the likelihood of the human voice increases in the voice state in response to the instruction of the ID numbers N2 and N3, and the distance between the person and the camera 11 decreases in the image state in response to the instruction of the ID number N4. By using the difference between the states, it is possible to improve the accuracy of picking up the target sound.

The processing of step S42 described above is not limited to be performed before the output of the instruction (S43), and may be performed simultaneously with step S43, for example. The processing in step S42 can be executed prior to the state detection (S44) after the instruction, and may be executed before step S41, for example. In this case, the detection result of step S42 may be used to determine the instruction content (S41). In addition, as the state detection before the instruction may be executed before step S3, the processing of step S42 may be omitted, and the detection results of steps S12 and S22 may be used instead.

Furthermore, in the above description, an example is described where the instruction is changed so as to resolve the state in which it is difficult to pick up sound, but the instruction may be fixed. For example, a content such as "Please face the camera and speak in a loud voice." may be adopted as the instruction content. Even with such a uniform instruction, it is expected that the state can be improved so that sound can be picked up.

2-5. Sound Pickup Processing without Instruction (S5)

Details of the processing of step S5 in FIG. 4 will be described with reference to FIG. 12.

Figure 12:
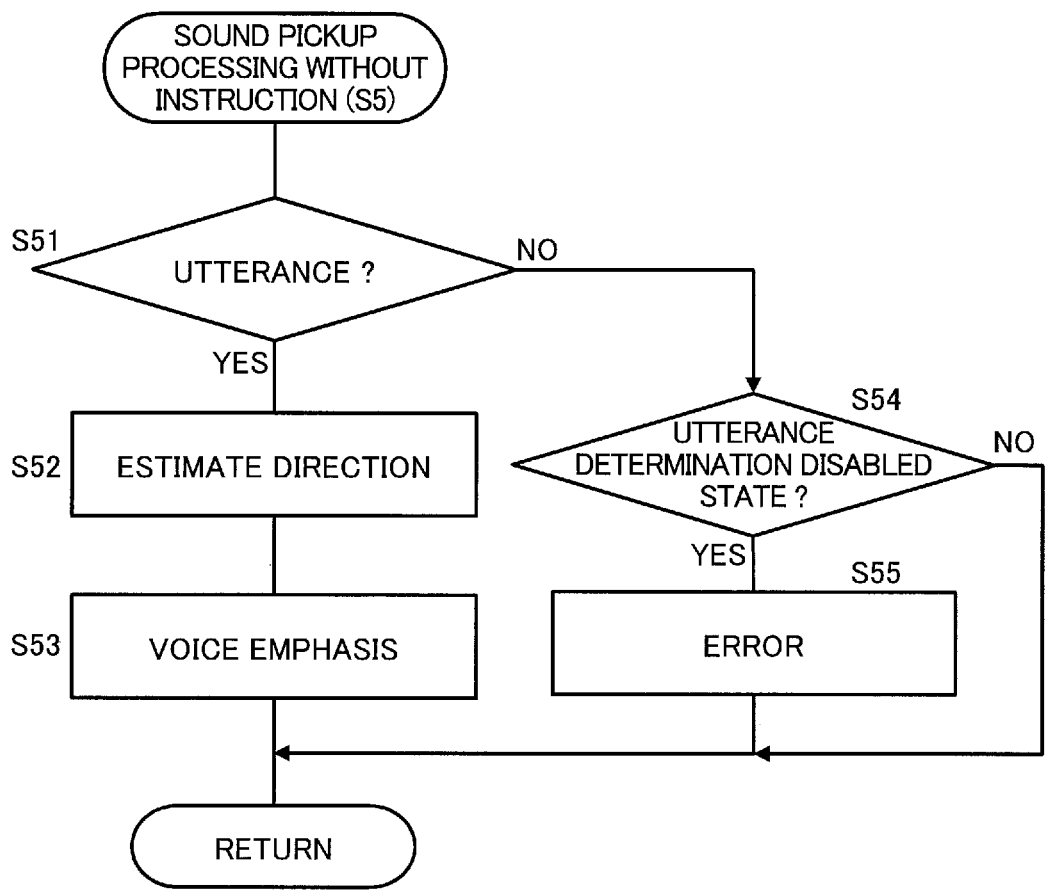
FIG. 12 is a flowchart illustrating sound pickup processing without an instruction in the sound pickup device.

FIG. 12 is a flowchart illustrating sound pickup processing (S5) without an instruction. The processing illustrated in this flowchart is executed when the current state is any of States 1, 2, 4, and 5 in FIG. 9 (NO in S3).

For example, the controller 13 first determines whether or not it is determined that the utterance is present in the current state (S51). For example, in a case where at least one of the utterance flag on the image side and the utterance flag on the audio side is "ON" in States 1 and 2, the controller 13 proceeds to YES in step S51. On the other hand, in other cases, the controller 13 proceeds to NO in step S51.

When it is determined that the utterance is present in the current state (YES in S51), the controller 13, serving as the direction estimator 36, performs calculation to estimate the sound pickup direction (S52). For example, the processing in step S42 is performed using the detection result of the current image state (S12 in FIG. 6) and the detection result of the audio state (S22 in FIG. 8).

Next, the controller 13, serving as the signal processor 37, executes processing to emphasize the sound from the sound pickup direction of the calculation result (S53). The processing of step S53 is performed similarly to step S47 in FIG. 10, for example. In step S53, the target sound is picked up without using the instruction.

After executing the voice emphasis (S53), the controller 13 ends the processing of step S5 in FIG. 4. Thereafter, the controller 13 returns to step S1, and performs the subsequent processing again, for example.

On the other hand, when, the presence of the utterance is not determined (NO in S51), the controller 13 determines whether or not the current state is State 5 in FIG. 9, that is, the utterance determination disabled state, for example (S54).

When the current state is State 5 (YES in S54), the controller 13 causes various output interfaces to output notification of an error (S55), and ends step S5, for example. For example, the controller 13 causes the display 17 to display an error message or the like in order to notify a sound that has not been picked up. The processing in steps S54 and S55 may be omitted as appropriate.

On the other hand, when the current state is not State 5 (NO in S54), the controller 13 ends step S5 without particularly performing the processing of step S55. In this case (NO in S51 and S54), as it is determined that no utterance is present in States 1, 2, and 4, the processing of steps S52 and S53 can also be omitted.

According to the above sound pickup processing (S5) without the instruction, in a case where there is an utterance in States 1 and 2 and sound the utterance can be picked up without using an instruction (YES in S51), sound pickup can be achieved without outputting an unnecessary instruction (S53), for example. Furthermore, in a case where it is determined that no utterance is present (NO in S51), an unnecessary instruction can be prevented from being output.

In the above processing, before step S51, the controller 13 may determine whether or not the current state is the same as the state in the previous control cycle, for example. In this case, the controller 13 may perform the processing of step S51 and subsequent steps only when it is determined that the current state is not the same as the previous state. When it is determined that the current state is the same as the previous state, the same processing as the previous processing may be applied to the subsequent processing. For example, the same sound pickup direction may be used.

3. Summary

The sound pickup device 10 according to the present disclosure picks up a target sound such as a voice of an utterance that a user such as the person 21 outputs from the mouth as an example of a sound source. The sound pickup device 10 includes the first input interface, the second input interface, the controller 13, and the output interfaces such as the voice output interface 16, the display 17, and the input/output interface 15. The controller 13 as the first input interface inputs the image data generated by the camera 11 (S11). The controller 13 as the second input interface inputs the audio signal output from the microphone array 12 (S21). The controller 13 determines the sound pickup direction in which the target sound is picked up, based on the image data and the audio signal (S3, S4). The output interface outputs information to be presented to the user. The controller 13 determines whether or not the image indicated by the input image data and the audio sound indicated by the input audio signal are in a predetermined state such as State 3 in FIG. 9

(S3). When determining that the image and the audio sound are in the predetermined state (YES in S3), the controller 13 causes the output interface to output an instruction to the user (S43), inputs additional image data and an additional audio signal after the instruction is output (S44), and determines a sound pickup direction (S46, S47).

According to the sound pickup device 10 described above, when the target sound is presumed to be difficult to pick up (YES in S3), an instruction is output to the user (S43), and the sound pickup direction is determined using the subsequent image data and audio signal (S46, S47). As a result, even in a situation where it may be difficult to pick up the target sound, it is possible to facilitate to pick up the target sound.

In the present embodiment, the controller 13 detects a difference (i.e., image difference) between the image data input after the instruction and the image data input before the image data and a difference (i.e., an audio difference) between the audio signal input after the instruction and the audio signal input before the audio signal (S45), to determine the sound pickup direction (S46, S47). As a result, it is possible to efficiently obtain the change in the state improved by the user according to the instruction and improve the accuracy of picking up the target sound.

In the present embodiment, the controller 13 calculates a score corresponding to the magnitude of the difference between the image data and the difference between the audio signals for each direction in the plurality of directions for each region r (θ, φ) of the unit of detection as a candidate for the sound pickup direction (see FIG. 7), and determines the direction having the largest calculated score as the sound pickup direction (S46). With such simple calculation processing, it is possible to easily pick up the target sound.

In the present embodiment, the sound pickup device 10 further includes the memory 14 that stores the state table D1 for classifying states of the image and audio sound. The controller 13, referring to the state table D1, determines information to be included in the instruction according to the image and the audio sound when it is determined that the image and the audio sound are in the predetermined state (S41). For example, as illustrated in FIG. 11, the controller 13 changes information to be included in the instruction so as to resolve the predetermined state. It is possible to appropriately set an instruction exemplified to the user according to the state determined from the image and the audio sound. Thus, this can facilitate to improve the current state.

In the present embodiment, when determining that the image and the audio sound are not in the predetermined state (NO in S3), the controller 13 determines the sound pickup direction without outputting an instruction (S5). As a result, it is possible to avoid frequent occurrence of unnecessary instructions and make it easy for the user to use the sound pickup device 10.

In the present embodiment, the controller 13 detects information indicating the arrangement of the sound source in the image on the basis of the image data (S12), detects a target sound and noise in the audio sound on the basis of the audio signal (S22), and determines the sound pickup direction according to the detection results of the image data and the audio signal (S3, S4). The predetermined state is a state including a fault in determining the sound pickup direction as in State 3. According to this state, the controller 13 does not determine the sound pickup direction according to the detection result. Even when such a predetermined state occurs, it is possible to easily pick up the target sound by outputting an instruction to the user to improve the state having the fault.

In the present embodiment, the sound pickup device 10 may include at least one of the camera 11 or the microphone array 12. The sound pickup device 10 may not include the camera 11 or the microphone array 12.

A sound pickup method according to the present embodiment is a method for picking up a target sound that a user is caused to output from a sound source, and includes: inputting (S11) image data generated by the camera 11; inputting (S21) an audio signal output from the microphone array 12; and determining (S3) whether or not an image indicated by the input image data and an audio sound indicated by the input audio signal are in a predetermined state. The method includes outputting (S43) an instruction to the user when it is determined that the image and the audio sound are in a predetermined state; and inputting (S44 to S47) additional image data and an additional audio signal after the instruction is output, to determine a sound pickup direction. According to the present method, the target sound can be easily picked up.

In the present embodiment, a program for causing a computer to execute the sound pickup method as described above is provided. Such a program can be provided by being stored in various storage media including, for example, the memory 14, or can be provided via a communication network.

Other Embodiments

As described above, the first embodiment has been described as an example of the technology disclosed in the present application. However, the technology in the present disclosure is not limited to this, and is applicable to embodiments in which changes, replacements, additions, omissions, and the like are appropriately made. Further, each component described in each of the above embodiments can be combined to make a new embodiment. Therefore, other embodiments are described below.

In the above embodiment, the case where the horizontal angle θ and the vertical angle φ are determined as the sound pickup direction has been described. However, in a case where the direction of the target sound source can be specified only by at least one of the horizontal angle θ and the vertical angle φ, it is only necessary to determine at least one of the horizontal angle θ and the vertical angle φ.

In the above embodiment, the voice uttered by the person is picked up as the target sound; however, the target sound is not limited to the sound uttered by the person, and may be various sounds uttered by the person. The target sound may be a sound of a car, a cry of an animal, or an operation sound of equipment. By presenting an instruction to the user who desires to pick up such a target sound when it is difficult to pick up the target sound as in the first embodiment, it is possible to easily pick up the target sound.

As described above, the embodiments have been described as an example of the technology in the present disclosure. To that end, the accompanying drawings and the detailed description are provided.

Accordingly, some of the components described in the accompanying drawings and the detailed description may include not only essential components for solving the problem but also components which are not essential for solving the problem in order to describe the above technology. Therefore, the fact that those non-essential components are described in the accompanying drawings and the detailed description should not immediately mean that those non-essential components are essential.

Further, the above-described embodiments are provided to illustrate the technology in the present disclosure, and hence it is possible to make various changes, replacements, additions, omissions, and the like within the scope of claims or the equivalent thereof.

The sound pickup device of the present disclosure is useful, for example, as a device that picks up a voice uttered by a person.

The invention claimed is:

1. A sound pickup device for picking up a target sound that is output by a user, the sound pickup device comprising:
a first input interface that inputs image data generated by a camera;
a second input interface that inputs an audio signal output from a microphone array;
a controller that determines a sound pickup direction in which the target sound is picked up, based on the image data and the audio signal; and
an output interface that outputs information to be presented to the user,
wherein the controller determines whether or not an image indicated by the input image data and an audio sound indicated by the input audio signal are in a predetermined state,
wherein when it is determined that the image and the audio sound are in the predetermined state, the controller
causes the output interface to output an instruction to the user,
in response to the instruction being output to the user, inputs additional image data and an additional audio signal after the instruction is output, and
detects an image difference and an audio difference to determine the sound pickup direction based on the image difference and the audio difference, the image difference being a difference between the additional image data input after the instruction and the image data input before the additional image data, and the audio difference being a difference between the additional audio signal input after the instruction and the audio signal input before the additional audio signal.

2. The sound pickup device according to claim 1, wherein the controller calculates a score corresponding to a magnitude of the image difference and the audio difference for each direction in a plurality of directions as a candidate for the sound pickup direction, and determines a direction having a largest calculated score as the sound pickup direction.

3. The sound pickup device according to claim 1, further comprising a memory that stores a state table in which states of an image and an audio sound are classified,
wherein referring to the state table, the controller determines information to be included in the instruction according to the image and the audio sound used when determining that the image and the audio sound are in the predetermined state.

4. The sound pickup device according to claim 1, wherein the controller determines the sound pickup direction without outputting the instruction, when it is determined that the image and the audio sound are not in the predetermined state.

5. The sound pickup device according to claim 1,
wherein the controller
detects information indicating an arrangement of a sound source in the image, based on the image data,
detects the target sound and noise in the audio sound, based on the audio signal, and
determines the sound pickup direction, according to detection results of the image and the audio sound,
wherein the predetermined state is a state in which the detection results of the image and the audio sound include a fault in determining the sound pickup direction.

6. The sound pickup device according to claim 1, comprising at least one of the camera or the microphone array.

7. A sound pickup method for picking up a target sound that is output by a user, the sound pickup method comprising:
inputting image data generated by a camera;
inputting an audio signal output from a microphone array;
determining whether or not an image indicated by the input image data and an audio sound indicated by the input audio signal are in a predetermined state;
outputting an instruction to the user when it is determined that the image and the audio sound are in the predetermined state;
in response to the instruction being output to the user, inputting additional image data and an additional audio signal after the instruction is output; and
detecting an image difference and an audio difference to determine a sound pickup direction in which the target sound is picked up, based on the image difference and the audio difference, the image difference being a difference between the additional image data input after the instruction and the image data input before the additional image data, and the audio difference being a difference between the additional audio signal input after the instruction and the audio signal input before the additional audio signal.

8. A non-transitory computer-readable recording medium storing a program that causes a computer to execute the sound pickup method according to claim 7.

* * * * *